United States Patent
Fan et al.

(10) Patent No.: US 7,388,866 B2
(45) Date of Patent: Jun. 17, 2008

(54) SYSTEM AND METHOD FOR EXPEDITING UPPER LAYER PROTOCOL (ULP) CONNECTION NEGOTIATIONS

(75) Inventors: Kan Frankie Fan, Diamond Bar, CA (US); Uri Elzur, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 928 days.

(21) Appl. No.: 10/377,833

(22) Filed: Mar. 3, 2003

(65) Prior Publication Data

US 2003/0169775 A1    Sep. 11, 2003

Related U.S. Application Data

(60) Provisional application No. 60/362,531, filed on Mar. 7, 2002.

(51) Int. Cl.
H04L 12/56    (2006.01)
(52) U.S. Cl. ................. 370/392; 709/227; 709/228
(58) Field of Classification Search ............. 370/392; 709/228, 227
See application file for complete search history.

(56) References Cited

U.S. PATENT DOCUMENTS 5,958,053 A    9/1999  Denker ................. 713/201
6,823,387 B1 *  11/2004  Srinivas ................. 709/227
7,058,718 B2 *  6/2006  Fontes et al. ........... 709/228
2002/0085562 A1 *  7/2002  Hufferd et al. .......... 370/392

FOREIGN PATENT DOCUMENTS

WO    WO 99/48303    3/1999
WO    WO 02/03084    6/2001

OTHER PUBLICATIONS

S. Gibson, "A Simple TCP/IP Implementation Enhancement To Eliminate Denial Of Service (DoS) Vulnerability" Part I, pp. 1-5, http://grc.com/r&d/nomoredos.htm, and Part II, pp. 1-9, http://grc.com/r&d/nomoredos2.htm, Gibson's Encryption-Enhanced Spoofing Immunity System, Oct. 8, 2001.*
Schuba C L et al.: "Analysis of a denial of service attack on TCP" Security and Privacy, 1997.

* cited by examiner

*Primary Examiner*—Chi Pham
*Assistant Examiner*—Albert T. Chou
(74) *Attorney, Agent, or Firm*—McAndrews, Held & Malloy, Ltd.

(57) ABSTRACT

Systems and methods that expedite connection negotiations. In one embodiment, a method expedites an upper layer protocol (ULP) negotiation between a first node and a second node. The method may include, for example, sending a modified acknowledgement packet from the first node to the second node, the modified acknowledgement packet including information that is used to retrieve parameters agreed upon by the first node and the second node in a previous ULP negotiation between the first node and the second node.

22 Claims, 4 Drawing Sheets

SYSTEM AND METHOD FOR EXPEDITING UPPER LAYER PROTOCOL (ULP) CONNECTION NEGOTIATIONS

RELATED APPLICATION

This application makes reference to, claims priority to and claims benefit from U.S. Provisional Patent Application Ser. No. 60/362,531, entitled "Method of RDMA Connection Negotiation" filed on Mar. 7, 2002.

INCORPORATION BY REFERENCE

The above-referenced United States patent application is hereby incorporated herein by reference in its entirety.

BACKGROUND OF THE INVENTION

In many types of networks or systems, resources in a first node may need access to resources in a second node. Especially in the case in which multiple connections or repeated connections are needed between the first node and the second node, the connection process can be very time consuming because, for example, the connection process views each connection process as a new and isolated case, despite the fact that the connection is between the same two nodes.

Further limitations and disadvantages of conventional and traditional approaches will become apparent to one of ordinary skill in the art through comparison of such systems with the present invention as set forth in the remainder of the present application with reference to the drawings.

BRIEF SUMMARY OF THE INVENTION

Aspects of the present invention may be found in, for example, systems and methods that expedite connection negotiations. In one embodiment, the present invention may provide a method that expedites an upper layer protocol (ULP) negotiation between a first node and a second node. The method may include, for example, sending a modified acknowledgement packet from the first node to the second node, the modified acknowledgement packet including information that is used to retrieve parameters agreed upon by the first node and the second node in a previous ULP negotiation between the first node and the second node.

In another embodiment, the present invention may provide a method that connects a first machine to a second machine. The method may include, for example, one or more of the following: sending a synchronization packet from the first machine to the second machine; sending a synchronization/acknowledgement packet from the second machine to the first machine; and sending a modified acknowledgement packet from the first machine to the second machine.

In yet another embodiment, the present invention may provide a method that creates a communications link between a first node and a second node. The method may include, for example, one or more of the following: setting up a transport layer protocol (TLP) connection between the first node and the second node; and sending information from the first node to the second node during the TLP connection set up, the information referencing parameters to expedite ULP negotiations for a particular type of ULP connection between the first node and the second node.

In yet still another embodiment, the present invention may provide a method that creates a communications link between a first node and a second node. The method may include, for example, one or more of the following: setting up a TLP connection between the first node and the second node; and sending information from the first node to the second node after the TLP connection set up, the information referencing parameters to expedite ULP negotiations for a particular type of ULP connection between the first node and the second node.

These and other features and advantages of the present invention may be appreciated from a review of the following detailed description of the present invention, along with the accompanying figures in which like reference numerals refer to like parts throughout.

DETAILED DESCRIPTION OF THE INVENTION

Aspects of the present invention may relate to systems and methods that expedite upper layer protocol (ULP) connection negotiations between a first node and a second node based upon, at least, previous ULP connection negotiations between the first node and the second node. Some embodiments may relate to systems and methods that expedite ULP connection negotiations by providing additional information during or immediately following the lower layer protocol (LLP) connection set up (e.g., a transport layer protocol (TLP) connection set up) between the first node and the second node. The additional information provided during the LLP connection set up between the first node and the second node may include, for example, information referencing previously negotiated and agreed upon parameters, credentials (e.g., application-specific credentials) and security information (e.g., cryptographic values). By using previously negotiated and agreed upon parameters from a particular connection between the first node and the second node, a full-blown ULP connection negotiation may be avoided for each subsequent connection. Previously negotiated and agreed upon parameters may be stored, for example, for each type of ULP or for each type of application between the first node and the second node.

Figure 1:
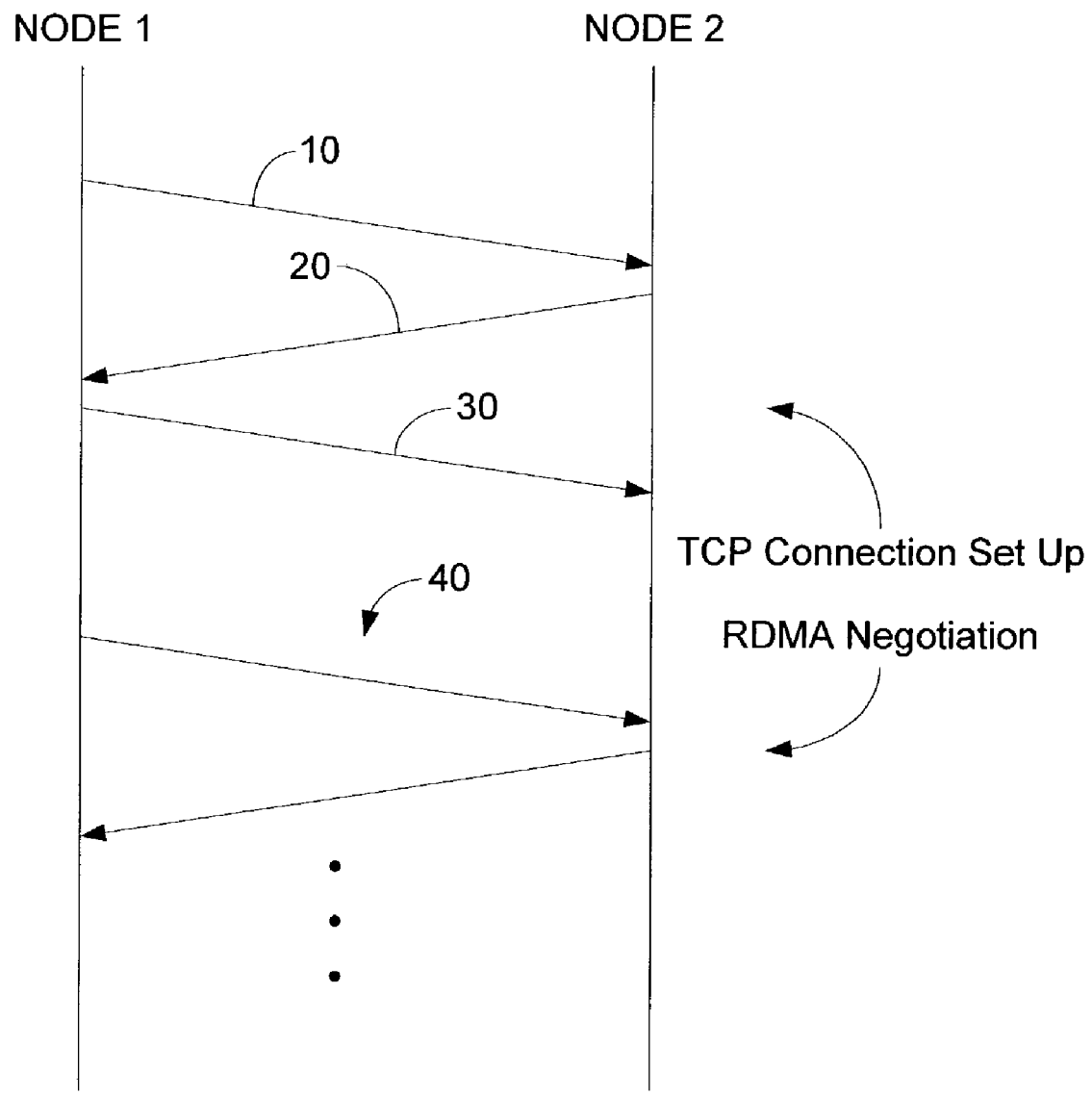
FIG. 1 shows a time flow diagram illustrating an embodiment of a connection set up process according to the present invention.

FIG. 1 shows a time flow diagram illustrating an embodiment of a connection set up process between two nodes according to the present invention. The connection process is illustrated as having two parts, although the present invention contemplates a connection process having more or less than two parts. In the first part, the connection process provides a transmission control protocol (TCP) connection set up process and, in the second part, the connection process provides a remote device memory access (RDMA) negotiation process. Although described in terms of these two particular processes, the present invention may be generally applied to other processes. Thus, for example, although described in terms of the TCP connection set up process, other LLP connection set up processes may be used. Furthermore, although described with respect to an RDMA negotiation process other ULP or application-specific negotiation processes may be employed. Furthermore, the present invention also contemplates that node 1 or node 2 may provide more than one type of ULP connection and may participate in more than one type of ULP connection negotiation.

According to one embodiment, the TCP connection set up process begins with, for example, node 1 sending a synchronization (SYN) packet 10 to node 2. In response, node 2 sends a synchronization/acknowledgement (SYN/ACK) packet 20 to node 1. Subsequently, node 1 sends an ACK packet 30 to node 2. Thus, the TCP connection set up process is completed and the TCP connection is established.

In the RDMA negotiation process, node 1 and node 2 have multiple exchanges of information packets 40. During this negotiation process, node 1 and node 2 exchange information about, for example, capabilities, resources, preferences, etc. During the negotiation, an agreement is reached between node 1 and node 2 in which, for example, a selection of parameters (e.g., from the possible capabilities and resources) in light of particular preferences is agreed upon. Thus, the RDMA negotiation is completed.

Nodes may have multiple connections. In one example, the nodes (e.g., node 1 and node 2) can duplicate the process for TCP connection set up and RDMA negotiation as described above. However, since multiple connections between nodes can have many identical connection parameters as determined by the initial connection process, the present invention may contemplate using the initial connection process parameters to expedite other additional connections, which may be concurrent or otherwise.

The initial connection process parameters as well as, for example, the connection parameters of subsequent connections may be securely stored and accessed such that the connections are immune to hijacking. For example, an unauthorized user may not be able to access the initial connection process parameters, which may have been used to expedite the n-th connection between the nodes. Accordingly, the unauthorized user may not be able to hijack the n-th or any other connection between the nodes.

Some embodiments of the present invention may provide resilience against attacks such as, for example, denial-of-service (DoS) attacks. In a DoS attack, an attacker attempts to consume as many resources on the targeted system (i.e., the attacked system) to prevent the targeted system from providing services to other machines. Under some circumstances, an RDMA connection may require many more resources than, for example, a plain TCP connection to be allocated on participating machines such as, for example, dedicated data structures (e.g., dedicated memory buffers). The attacker may try to tie down as many resources as it can by fooling the attacked machine into allocating resources early in the negotiation. The attacker may try to cause the attacked machine to allocate resources before the completion of the negotiation, before the attacked machine has verified the credentials of the attacker and/or before the attacker has to commit resources on its side.

According to one embodiment, for the first connection between two machines, no RDMA resources may be consumed before the completion of a three-way TCP connection negotiation. The completion of the three-way TCP connection negotiation may burden both sides, thereby, along with potential additional credentials, assuring the server machine before the server machine commits more resources for promoting the connection to RDMA. For a subsequent connection, a shorter negotiation may occur. If an attacker were to imitate node 1 (e.g., the client) asking for RDMA services from node 2 (e.g., the server), then node 2 might mistakenly place trust in the connection as other connections may already exist between node 1 and node 2 and node 2 may have checked all of its credentials. Accordingly, in one embodiment, node 1 should provide credentials to node 2 before node 2 commits resources to RDMA connection on its side.

Figure 2:
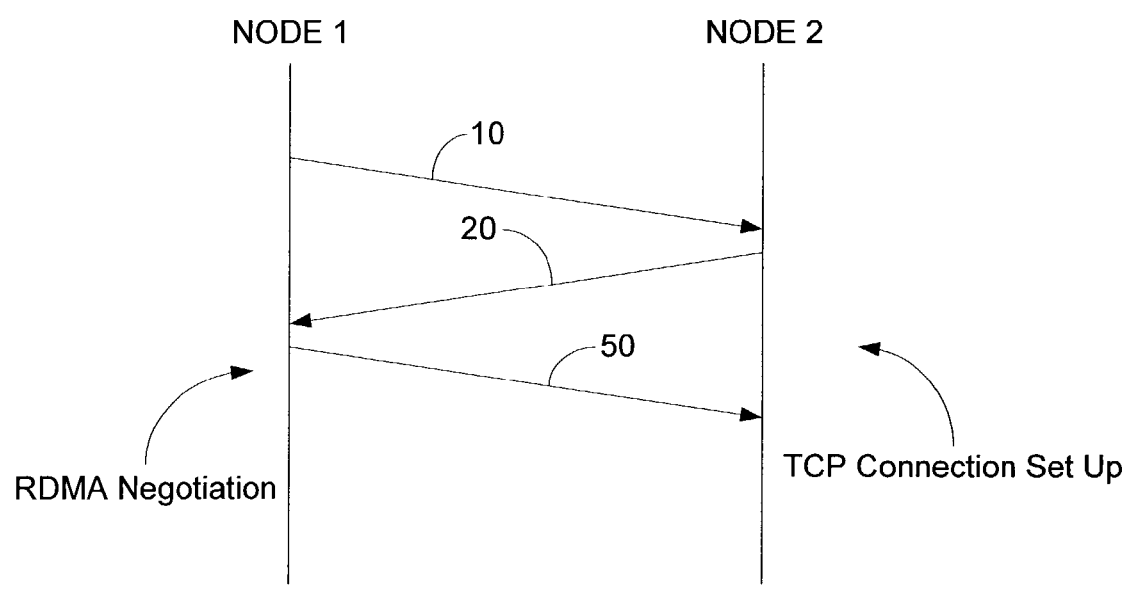
FIG. 2 shows a time flow diagram illustrating an embodiment of a process used in a subsequent connection process according to the present invention.

In another example, after node 1 and node 2 have successfully completed the RDMA negotiation for one connection, at least one node stores the agreed upon parameters from the RDMA negotiations in respective memory storage devices that are accessible by or part of node 1 or node 2. In one embodiment, either node 1 or node 2 may act as a client or a server or both. In a client/server configuration, the server may secure its resources. In another embodiment, node 1 and node 2 may be two peers trying to establish an RDMA connection. Either of the peers may be node 1 or node 2. FIG. 2 shows a time flow diagram and FIG. 3 shows a flowchart illustrating an embodiment of a process used in subsequent connection processes between node 1 and node 2 according to the present invention.

Figure 3:
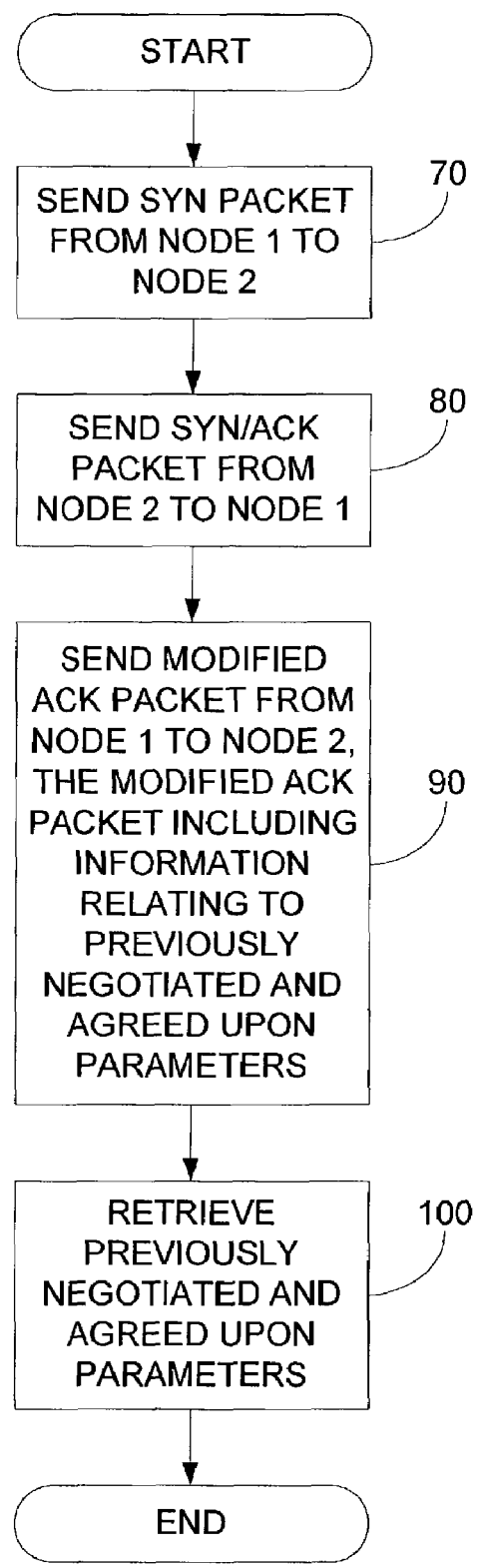
FIG. 3 shows a flowchart illustrating an embodiment of a process used in a subsequent connection process according to the present invention.

For establishing a subsequent RDMA connection using a shortened negotiation phase, an embodiment of the process illustrated in FIG. 3 may be followed. The TCP connection set up process begins, in step 70, with node 1 sending the SYN packet 10 to node 2. In step 80, node 2 responds by sending the SYN/ACK packet 20 to node 1. In response, in step 90, node 1 sends a modified ACK packet 50 to node 2. Thus, the TCP connection set up process is completed and the TCP connection is established.

The RDMA negotiation process also encompasses the sending of the modified ACK packet 50 from node 1 to node 2. Since node 1 and node 2 have already gone through an RDMA negotiation process and stored the negotiated and agreed upon parameters in a memory storage device (e.g., in respective memory storage devices), in step 90, node 1 can send memory storage location information via modified ACK packet 50 to node 2 so that node 2 may bring up the previously negotiated and agreed upon parameters. The memory storage location information may be in the form of a cookie (e.g., a cryptographically protected memory address) that is, in one example, added to or included in the ACK packet 30 to form the modified ACK packet 50. In one embodiment, a reference to previously established credentials may be supplied by node 1 along with the memory storage location. In one embodiment, in step 100, both node 1 and node 2 can retrieve the previously negotiated and agreed upon parameters that were stored in respective memory storage devices. Alternatively, one node can retrieve the previously negotiated and agreed upon parameters and pass the information to the other node. Thus, if both node 1 and node 2 agree to use the previously stored negotiated and agreed upon parameters, then the RDMA negotiation is completed without the additional back and forth of the information packets 40 in the negotiation process illustrated in FIG. 1 and described above. Thus, the connection process is completed. In another embodiment, node 1 (e.g., a client) may know the parameters before requesting a connection set up. Accordingly, it may just be node 2 (e.g., a server which may serve a plurality of clients) that may need to fetch the requested parameters for the connection, thereby completing the connection process. In yet another embodiment, node 1 may know the parameters before requesting a connection set up. Node 1 may then send the parameters or indications of the parameters to node 2, thereby completing the connection process. However, if either node 1 or node 2 chooses not to accept the previously stored negotiated parameters, then the typical negotiation process as illustrated in FIG. 1 and described above may be used to complete the RDMA negotiation. In another embodiment, if either node 1 or node 2 chooses not to accept the previously stored negotiated parameters, then the retrieved parameters may provide a starting point from which the negotiation process may commence.

Figure 4:
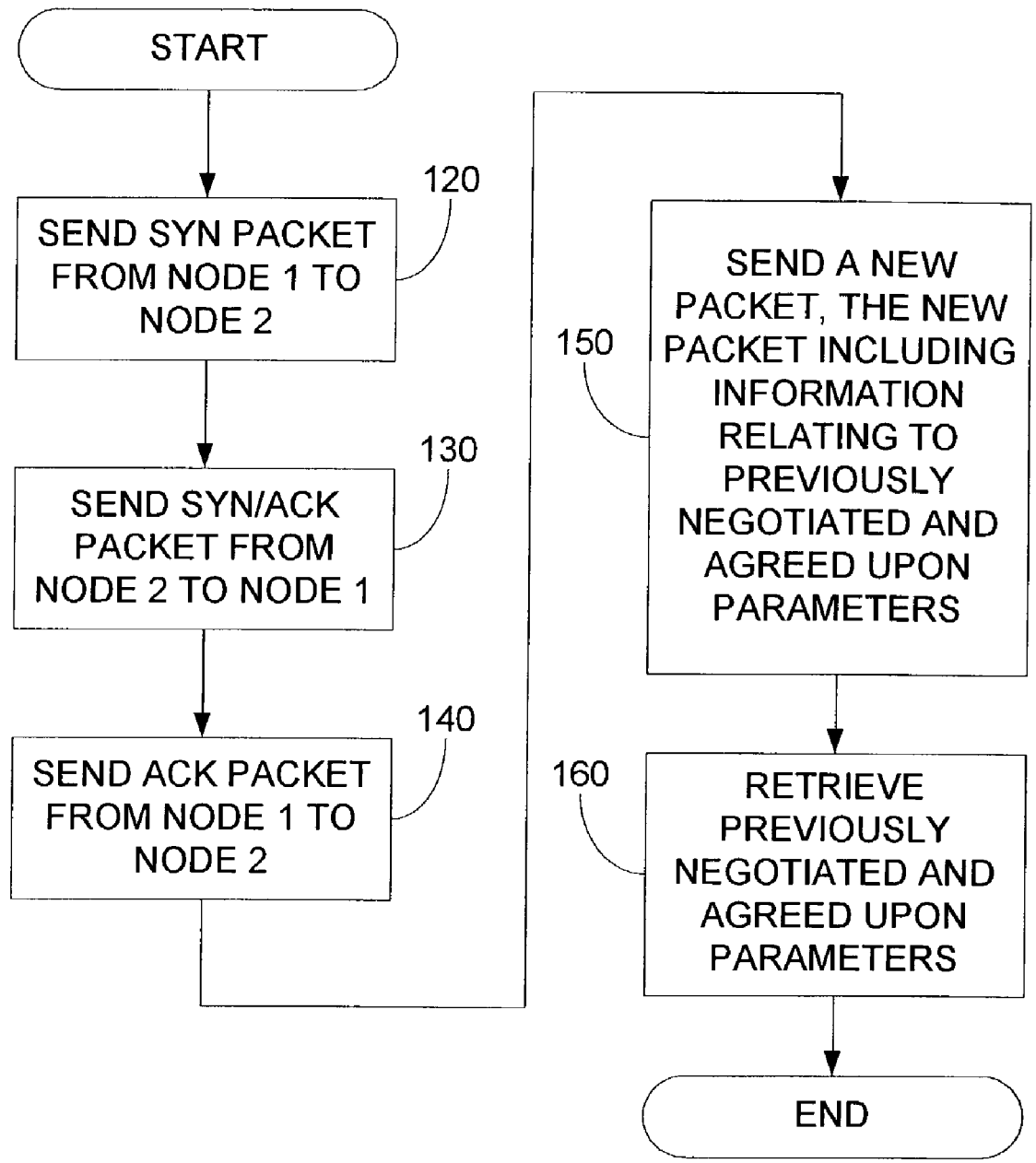
FIG. 4 shows a flowchart illustrating another embodiment of a process used in a subsequent connection process according to the present invention.

For establishing a subsequent RDMA connection using a shortened negotiation phase, another embodiment of the process illustrated in FIG. 4 may be followed. The TCP connection set up process begins, in step 120, with node 1 sending the SYN packet 10 to node 2. In step 130, node 2 responds by sending the SYN/ACK packet 20 to node 1. In response, in step 140, node 1 sends an ACK packet 50 to node 2. Thus, the TCP connection set up process is completed and the TCP connection is established.

In step 150, node 1 sends a shortened version of the ULP or RDMA negotiation. Since node 1 and node 2 have already gone through, for example, an RDMA negotiation process and stored the negotiated and agreed upon parameters in a memory storage device (e.g., in respective memory storage devices), in step 150, node 1 can send memory storage location information via an additional packet to node 2 so that node 2 may bring up the previously negotiated and agreed upon parameters. The memory storage location information may be in the form of a cookie (e.g., a cryptographically protected memory address) that is, in one example, added to or included in the new packet. In one embodiment, a reference to previously established credentials may be supplied by node 1 along with the memory storage location. In one embodiment, in step 160, both node 1 and node 2 can retrieve the previously negotiated and agreed upon parameters that were stored in respective memory storage devices. Alternatively, one node can retrieve the previously negotiated and agreed upon parameters and pass the information to the other node. Thus, if both node 1 and node 2 agree to use the previously stored negotiated and agreed upon parameters, then the RDMA negotiation is completed without the additional back and forth of the information packets 40 in the negotiation process illustrated in FIG. 1 and described above. Thus, the connection process is completed. In another embodiment, node 1 (e.g., a client) may know the parameters before requesting a connection set up. Accordingly, it may just be node 2 (e.g., a server which may serve a plurality of clients) that may need to fetch the requested parameters for the connection, thereby completing the connection process. In yet another embodiment, node 1 may know the parameters before requesting a connection set up. Node 1 may then send the parameters or indications of the parameters to node 2, thereby completing the connection process. However, if either node 1 or node 2 chooses not to accept the previously stored negotiated parameters, then the typical negotiation process as illustrated in FIG. 1 and described above may be used to complete the RDMA negotiation. In another embodiment, if either node 1 or node 2 chooses not to accept the previously stored negotiated parameters, then the retrieved parameters may provide a starting point from which the negotiation process may commence.

Some embodiments according to the present invention may provide machines that expose a plurality of different types of services (e.g., RDMA, iSCSI over RDMA, HTTP, etc.) Accordingly, between two particular machines, the information relating to previously negotiated and agreed upon parameters between the two particular machines for particular services should be stored. For example, if the two machines have previously established connections over RDMA and iSCSI, then the information related to the previously negotiated and agreed upon parameters between the two machines should be stored for the RDMA connection and the iSCSI connection. Accordingly, part of the information carried during an LLP connection set up (e.g., a TLP connection set up) during subsequent attempts at establishing an RDMA connection or an iSCSI connection should indicate which type of connection is desired. The information may include, for example, a destination port and/or credentials (e.g., particular ULP credentials).

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for expediting an upper layer protocol (ULP) negotiation between a first node and a second node, the method comprising:
   during establishment of a current connection, sending a modified acknowledgement packet from the first node to the second node, the modified acknowledgement packet comprising information that is used to retrieve parameters agreed upon by the first node and the second node in a previous ULP negotiation corresponding to a previous connection between the first node and the second node.

2. The method according to claim 1, wherein the modified acknowledgement packet comprises information that is used to complete a current transport layer protocol (TLP) connection set up process, the TLP corresponding to a lower layer than the ULP.

3. The method according to claim 2, wherein the ULP negotiation and the TLP connection set up process overlap in time.

4. A method for connecting a first machine to a second machine, the method comprising:
   during establishment of a current Lower Layer Protocol (LLP) connection:
      sending a synchronization (SYN) packet from the first machine to the second machine;
      responsive to the SYN packet, sending a synchronization/acknowledgement (SYN/ACK) packet from the second machine to the first machine;
      responsive to the SYN/ACK packet, sending a modified acknowledgement packet from the first machine to the second machine, where the modified acknowledgement packet comprises information used to expedite an Upper Layer Protocol (ULP) negotiation between the first machine and the second machine; and
      retrieving previously negotiated and agreed upon parameters corresponding to a previous ULP connection.

5. The method according to claim 4, wherein the modified acknowledgement packet comprises information that is used to retrieve the previously negotiated and agreed upon parameters.

6. The method according to claim 4, further comprising using information transported in the modified acknowledgement packet to complete the LLP connection set up process and to further an Upper Layer Protocol (ULP) negotiation.

7. The method according to claim 4, further comprising:
after retrieving the previously negotiated and agreed upon parameters, sending the retrieved parameters to the first machine.

8. The method according to claim 4, wherein the modified acknowledgment packet comprises a cookie comprising information used to retrieve the previously negotiated and agreed upon parameters corresponding to the previous Upper Layer Protocol (ULP) connection.

9. The method according to claim 4, wherein retrieving previously negotiated and agreed upon parameters comprises retrieving previously negotiated and agreed upon parameters in at least one of the first machine and the second machine using information that was stored in the modified acknowledgment packet.

10. The method according to claim 4, further comprising:
if the first machine and the second machine both agree to the retrieved parameters, then using the retrieved parameters to complete an Upper Layer Protocol (ULP) negotiation process.

11. The method according to claim 4, further comprising:
if the first machine and the second machine do not both agree to the retrieved parameters, then using the retrieved parameters as a starting point in an Upper Layer Protocol (ULP) negotiation process.

12. A method for creating a communications link between a first node and a second node, the method comprising:
setting up a Transport Layer Protocol (TLP) connection between the first node and the second node; and
sending information from the first node to the second node during the TLP connection set up, the information referencing parameters to expedite Upper Layer Protocol (ULP) negotiations for a particular type of ULP connection between the first node and the second node, the ULP corresponding to a higher layer than the TLP,
wherein the information referencing parameters to expedite ULP negotiations comprises information relating to previously negotiated and agreed upon parameters corresponding to a previous ULP connection for the particular type of ULP connection between the first node and the second node.

13. The method according to claim 12, wherein the information comprises a credential identifying the particular type of ULP connection requested.

14. The method according to claim 12, wherein the information comprises security information securing the second node from attack.

15. The method according to claim 14, wherein the security information comprises a cryptographic value.

16. The method according to claim 12, wherein the second node verifies at least one of a credential and security information provided by the first node during the TLP connection set up before allocating resources of the second node for the first node.

17. The method according to claim 12, further comprising:
securely storing and accessing the parameters from a previous ULP negotiation for the particular type of ULP connection between the first node and the second node.

18. The method according to claim 12, further comprising:
providing credentials to the second node from the first node, before committing additional resources to the particular type of ULP connection on second node's side.

19. A method for creating a communications link between a first node and a second node, the method comprising:
setting up a Transport Layer Protocol (TLP) connection between the first node and the second node; and
sending information from the first node to the second node after the TLP connection set up, the information referencing parameters to expedite Upper Layer Protocol (ULP) negotiations for a particular type of ULP connection between the first node and the second node, the ULP corresponding to a higher layer than the TLP,
wherein sending the information from the first node to the second node comprises sending a packet from the first node to the second node, the packet comprising information relating to previously negotiated and agreed upon parameters corresponding to a previous ULP connection for the particular type of ULP connection between the first node and the second node.

20. The method according to claim 19, wherein setting up the TLP connection comprises a three-way TLP connection negotiation.

21. A first node that operates to expedite an Upper Layer Protocol (ULP) negotiation with at least a second node in a communication system, where the first node operates to, at least:
during establishment of a current connection, send a modified acknowledgement packet to the second node, the modified acknowledgement packet comprising information that is used to retrieve parameters agreed upon by the first node and the second node in a previous ULP negotiation corresponding to a previous connection between the first node and the second node.

22. A first node that operates to communicate with at least a second node in a communication system, where the first node operates to, at least:
set up a Transport Layer Protocol (TLP) connection between the first node and the second node; and
send information to the second node during the TLP connection set up, the information referencing parameters to expedite Upper Layer Protocol (ULP) negotiations for a particular type of ULP connection between the first node and the second node, the ULP corresponding to a higher layer than the TLP,
wherein the information referencing parameters to expedite ULP negotiations comprises information relating to previously negotiated and agreed upon parameters corresponding to a previous ULP connection for the particular type of ULP connection between the first node and the second node.

* * * * *